United States Patent [19]

Schmeing et al.

[11] Patent Number: 4,808,660

[45] Date of Patent: Feb. 28, 1989

[54] LATEX CONTAINING COPOLYMERS HAVING A PLURALITY OF ACTIVATABLE FUNCTIONAL ESTER GROUPS THEREIN

[75] Inventors: Walter A. Schmeing, Akron, Ohio; Woodrow W. White, Orlando, Fla.

[73] Assignee: GenCorp Inc., Akron, Ohio

[21] Appl. No.: 25,249

[22] Filed: Mar. 12, 1987

Related U.S. Application Data

[63] Continuation-in-part of Ser. No. 848,018, Apr. 3, 1986, abandoned.

[51] Int. Cl.$^4$ .................... C08F 20/38; C08F 20/34
[52] U.S. Cl. .................... 524/812; 428/507; 524/547; 524/814; 524/817
[58] Field of Search ............ 524/547, 555, 558, 559, 524/812, 814, 817

[56] References Cited

U.S. PATENT DOCUMENTS

| | | | |
|---|---|---|---|
| 3,178,385 | 4/1965 | Dinges | 526/304 |
| 3,265,654 | 8/1966 | Glabisch | 526/304 |
| 3,422,139 | 1/1969 | Talet | 562/567 |
| 4,522,973 | 6/1985 | Ley | 524/555 |

Primary Examiner—Christopher Henderson

[57] ABSTRACT

A aqueous latex contains a functionalized copolymer prepared by emulsion polymerization. The copolymer can be applied to textile nonwoven materials and to various cellulosic substrates, and when utilized as a binder imparts enhanced properties thereto such as wet tensile strength, low temperature cure rates, and the like. The monomers generally forming the copolymer include at least two functional type monomers, one of which contains an activatable ester group, and at least one latex forming monomer.

4 Claims, 1 Drawing Sheet

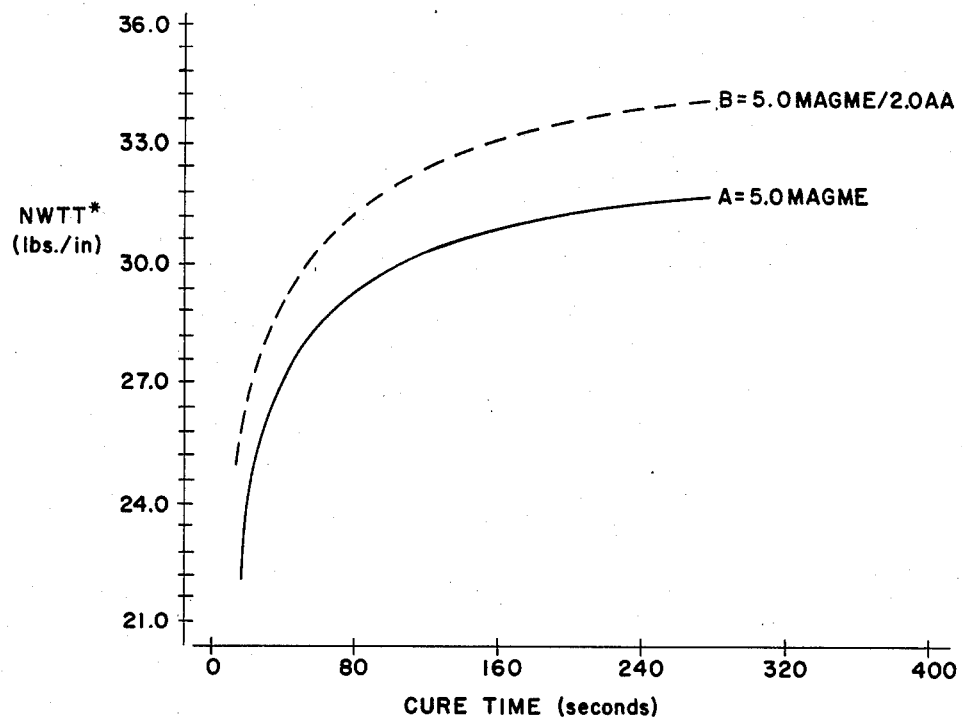
FIG.-1 *NORMALIZED WET TOTAL TENSILE (NWTT) {73.0 lbs./3000 S.F. and 20% ADD-ON}
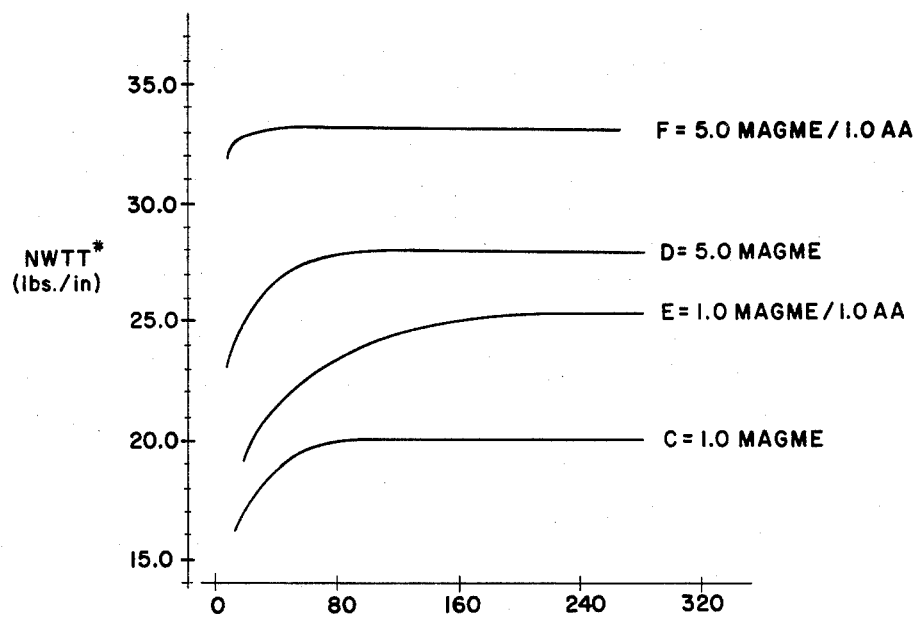
FIG.-2

LATEX CONTAINING COPOLYMERS HAVING A PLURALITY OF ACTIVATABLE FUNCTIONAL ESTER GROUPS THEREIN

CROSS REFERENCE

This application is a continuation-in-part of U.S. application Ser. No. 848,018 filed Apr. 3, 1986 now abandoned, for latexes containing copolymers having functional groups therein.

FIELD OF THE INVENTION

The present invention relates to copolymers made from latex type monomers and effective amounts of functional type monomers including a monomer containing an activatable ester group. The present invention further relates to cured latexes thereof.

PRIOR ART

A series of articles, namely, Polymer Journal Volume 5, pages 186–194 (1973); Volume 6, pages 412–418 (1974); Volume 7, pages 72–78 (1975) and Volume 10, pages 499–504 (1978), by Ogata, et al, generally relate to beta-hetero atom containing diesters or dibasic acids which react under mild conditions with amines to form polyamides.

U.S. Pat. No. 3,422,139 to Talet, et al, relates to acrylamino-N-glycolic acids as well as N-methylolacrylamido-N-glycolic acids and their use in treatment of paper.

European Patent Application No. 20,000 relates to ethylenically unsaturated monomers containing activated ester groups which are used to make polymers and copolymers useful in coatings, adhesives, and the like.

U.S. Pat. No. 4,254,003 to Fox relates to an aqueous dispersion of polymer particles wherein the polymer comprises both (a) polar groups such as amine and ureido groups and (b) poly(alkylene oxide) chains covalently bonded to the polymer. Such dispersed polymers are useful in latex paint compositions.

U.S. Pat. No. 4,443,623 to Photis relates to the preparation of methyl acrylamidoglycolate methyl ether and a normally liquid product.

U.S. Pat. No. 4,522,973 to Ley relates to a low temperature crosslinkable emulsion containing a crosslinkage polymer derived from an activated ester-containing vinyl monomer and including a crosslinking agent having a plurality of groups therein each capable of low temperature reaction with the activated ester group.

The above documents do not disclose the polymerization of the various comonomers in an aqueous latex or the various unexpected physical properties obtained when a plurality of functional type monomers having at least one monomer containing an activatable ester group therein is utilized at the levels employed in the present invention.

SUMMARY OF THE INVENTION

Accordingly, it is an aspect of the present invention to provide a latex type copolymer prepared by emulsion polymerization containing an activatable ester group.

It is another aspect of the present invention to provide a latex type copolymer, as above, made from monomers forming a latex emulsion as well as from a plurality of functional monomers, one of which has a polymerizable vinyl group and an activatable crosslinking ester group.

It is eyt a further aspect of the present invention to provide a latex type copolymer, as above, which when applied to nonwoven textile and cellulosic substrates generally yields improved end use properties and cure rates.

It is still another aspect of the present invention to provide a latex type copolymer, as above, which has improved wet strength upon cure.

These and other aspects of the present invention will become apparent from the following detailed specification.

In general, a curved emulsion copolymer, comprises the cured emulsion copolymer, said copolymer made from an effective amount of at least one latex forming monomer and two or more functional type monomers, wherein at least one of said functional type monomers has a vinyl group therein as well as an activatable ester group, and wherein at least one of said functional type monomers are the various acrylamides, the various methacrylamides, the various vinyl ethers, the various non-saturated mono or dicarboxylic acid, or combinations thereof.

BRIEF DESCRIPTION OF THE DRAWINGS

FIG. 1 is a chart of the wet tensile strength utilizing MAGME and acrylic acid as set forth in Example 1.

FIG. 2 is a chart of the wet tensile strength utilizing MAGME and acrylamide as set forth in Example 2.

DISCUSSION OF DETAILS AND PREFERRED EMBODIMENTS

The copolymers of the present invention are suitable for use as aqueous dispersions or latexes, as well as for various applications thereof. The functionalized copolymer of the present invention, that is, the emulsion copolymer is made from one or more latex forming monomers and two or more functional type monomers wherein at least one of said functional type monomers has an activatable ester group. Accordingly, the amount of the different types of monomers utilized, for example the latex forming monomers, will be based upon 100 parts by weight of the total monomers (PHM) utilized in forming the functionalized copolymer of the present invention. It is thus to be understood that hereinafter "total monomer" refers to all of the monomers that is the latex forming monomers and the two or more functional type monomers utilized in forming the functionalized copolymer of the present invention.

The latex forming monomers are known to the art and to the literature. One suitable class of latex forming monomers are the various conjugated dienes. A suitable latex forming copolymer thereof is made with either another conjugated diene monomer or preferably a vinyl substituted aromatic monomer. When a conjugated diene comonomer is utilized, the amount thereof is from about 1% to about 99% by weight based upon the total monomers utilized in forming the functionalized copolymer of the present invention. Generally, the percentage description will be utilized hereinafter. When a vinyl substituted aromatic comonomer is utilized, the amount thereof is from about 0% or 1% to about 70% and preferably from about 40% to about 65% by weight based upon the weight of the total monomers.

Considering the conjugate diene monomers, they generally have from about 4 to 8 carbon atoms and desirably from 4 to 6 carbon atoms. Examples of specific diene monomers include piperylene, isoprene, 2,3-dimethyl-1,3-butadiene, and preferably 1,3-butadiene. Mixtures of these various conjugated dienes can also be utilized. Considering the vinyl substituted aromatic monomers which can be utilized in association with the conjugated dienes to form copolymers, generally they have from 8 to about 12 total carbon atoms. Specific examples of such monomers include alpha methyl styrene, p-tertiary butyl styrene, methyl vinyl toluene, p-vinyl toluene, 3-ethyl styrene, and the like with styrene being preferred. Mixtures of such vinyl substituted aromatic monomers can also be utilized. Considering the acrylonitrile monomers, various derivatives thereof can be utilized such as methacrylonitrile, fumaronitrile, and the like.

Yet another suitable class of latex forming monomers are the various vinyl esters. Inasmuch as the vinyl esters usually yield very high glass transition temperature polymers, conventional amounts of plasticizers are generally utilized therewith such as dioctyl phthalate, or they are copolymerized with various comonomers. Suitable vinyl esters include monomers wherein the ester portion of the vinyl esters is desirably an alkyl having from 1 to 8 carbon atoms. A preferred vinyl ester is vinyl acetate. Examples of suitable comonomers include ethylene, and esters of various mono or dicarboxylic acids. When a latex forming copolymer is made from monomers of vinyl esters and ethylene, the amount of ethylene is from about 10% to about 95% by weight based upon the weight of the total monomers. When latex forming copolymers are made from vinyl ester monomers and the esters of mono or dicarboxylic acid, the amount of the mono or dicarboxylic acid esters is also from about 5% to about 50% by weight and desirably from about 15% to about 25% by weight based upon the weight of the total monomers. Considering the various types of esters of dicarboxylic acids which can be utilized as comonomers with the vinyl esters, they are generally esters of dicarboxylic acids having from 2 to 12 carbon atoms and desirably from 4 to 8 carbon atoms. Examples of such specific esters include diethyl fumarate, dibutyl fumarate, and diethyl maleate, and dibutyl maleate.

Yet another class of suiable latex forming monomers are the ethylene monomers. The ethylenes are generally always utilized in the form of a copolymer. Suitable latex forming copolymers are thus made utilizing ethylene and vinyl chloride or various vinyl ester monomers. The amount of vinyl chloride monomers utilized with ethylene is from about 5% to about 40% by weight based upon the weight of the total monomers. The amount of the vinyl ester utilized with the ethylene is from about 5 to about 90% by weight. The various types of vinyl ester monomers which can be utilized to form copolymers with the ethylene monomers are as set forth hereinabove.

Although the various latex forming monomers generally form the bulk of the emulsion copolymer, that is from about 85% to about 99.5%, desirably from about 90% to about 99%, and preferably from about 94% to about 97% by weight based upon the weight of the total monomers, it is an essential apsect of the present invention to utilize two or more different types of functional monomers. A type of functional monomer which is always utilized in the present invention is characterized by having at least one vinyl group therein which is polymerizable and at least one activatable ester group which enables the copolymer to be cured or crosslinked; hereinafter referred to as an activatable ester monomer. The various activatable ester monomers include:

methyl acrylamidoglycolate (MAG)
ethyl acrylamidoclycolate (EAG)
butyl acrylamidoglycolate (BAG)
methyl acrylamidoglycolate methyl ether (MAGME)
butyl acrylamidoglycolate butyl ether (BAGBE)
methyl methacryloxyacetate
ethyl acrylamido-N-oxalate (N-ethyloxalyl acrylamide)
N,N'-Bis(ethyloxalyl)acrylamide
N-isopropyl, N-ethyloxalyl-3-propylamino methacrylamide
N-ethyloxalyl-N'-methyleneaminoacrylamide
ethyl N-2-ethyloxamatoacrylate
ethyl 3-pyruvylacrylate
ethyl methylenepyruvate
methyl acrylthiocarbonyloxyacetate (Methyl thiacryloxyacetate)
methyl thiacrylthioglycolate
methyl acryl-2-thioglycolate
methyl thiacrylamidoacetate
methyl acrylamidoglycolate thioether
methyl acrylamido-N-methylenethioglycolate
p-ethyl oxalyl styrene,
and the like. Additional examples include the above compounds wherein an alkyl group having from 2 or 3 or 6 carbon atoms can be substituted for the various "methyl", or "ethyl", groups.

When the functional containing monomer contains an activatable acid group thereon, specific examples of such compounds are acid derivatives of the above compounds, for example acrylamidoglycolic acid, and the like.

The second or additional type of other functional monomers which are optionally utilized include anionic monomers such as, the various acrylamides, the various methacrylamides, the various vinyl ethers, and the various non-saturated mono-or dicarboxylic acids. In lieu of these anionic functional monomers, cationic monomeers can be utilized as set forth hereinbelow. The total amount of such monomers including the activatable ester functional monomers is generally small as from about 0.5% to about 15% by weight, desirably from about 1 to about 10% by weight and preferably from about 3% to about 6% by weight based upon the weight of the total monomers.

The acrylamides and the methacrylamides include various alkyl derivatives thereof having from 1 to 2 carbon atoms attached to either the nitrogen atom and/or the vinyl group with specific examples including dimethyacrylamide, methylene bisacrylamide, and the like.

The vinyl ethers are another class of vinyl type monomers which can be utilized in the present invention. They are generally represented by the formula

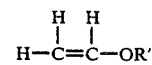

wherein; R' is an alkyl group having from 1 to 6 carbon atoms, or a substituted chloroalkyl group having a total of from 1 to 6 carbon atoms. Examples of such specific vinyl ethers include n-butyl vinyl ether, vinyl chloroethyl ethyl, and the like.

The acids which are utilized are an unsaturated monocarboxylic or a dicarboxylic acid monomer containing a total of from 3 to about 6 carbon atoms and preferably from 3 to about 5 carbon atoms. Examples of monocarboxylic acids include acrylic acid and methacrylic acid. Examples of dicarboxylic acids include fumaric acid, maleic acid, itaconic acid, and the like. Itaconic acid is preferred.

The amount of the acrylamides, the methacrylamides, the vinyl ethers, or the mono or dicarboxylic acid monomers, or combinations thereof generally range from about 0.5% to about 5% by weight and preferably from about 1% to about 5% by weight based upon the weight of the total monomer. Hence, the amount of activatable ester can be from about 1 to about 10% with the amount of the second functional monomer being from about 0.5 to about 5% thereby achieving the overall range of from about 0.5% to about 15% by weight of functional monomers.

The copolymer forming monomers of the present invention, that is the primary and the optional secondary latex forming monomers, and the two or more functional type monomers are reacted according to any conventional free radical aqueous emulsion polymerization method known to the art as well as to the literature to form the emulsion type copolymer of the present invention. Various copolyermization methods are discussed herein below.

Various conventional amounts of conventional emulsion polymerization additives can also be utilized. Such emulsion polymerization additives include various emulfiers, various chain transfer agents or extenders which act as molecular weight modifiers, various free-radical initiators, various chelating agents, various shortstops, electrolytes, and the like. Considering the emulsifiers, they can be any compound well known to the art as well as to the literature such as soaps, surfactants, dispersing agents, and the like which are stable at low pH, e.g. 1.5 to 3.5. The surfactants, as well as the other emulsifiers, can be cationic, anionic, or mixtures thereof with nonionics. Examples of specific emulsifiers include the various alkyl sulfates, the various alkyl sulfosuccinates, the various alkyl aryl sulfonates, the various alpha olefin sulfonates, the various quarternary ammonium salt, the various amine salts, the various fatty or resin acid salts, nonyl or octyl phenol reaction products of ethylene oxide and the like. The alkyl portion of the various emulsifiers generally has from 8 to 18 carbon atoms. Naturally, an amount of an emulsifier is utilized to obtain an aqueous emulsion of the various monomers. Generally, such an amount is typically from about 0.5 to about 5 or 6 parts by weight for every 100 parts by weight of the monomers. Other surfactants can be utilized such as those set forth in "Surface Active Agents," Schwartz and Perry, Vol. I, Interscience Publishers, Inc., New York, 1958; "Surface Activity," Moilliet, Collie and Black, D. Van Nostrand Company, Inc., New York, 1961; "Organic Chemistry," Fieser and Fieser, D. C. Heath and Company, Boston, 1944; and "The Merck Index," Seventh Edition, Merck & Co., Inc., Rahway, N.J., 1960, all of which are hereby fully incorporated by reference.

The various chain extenders or molecular weight regulators can be conventional compounds as well as those known to the art and to the literature. Accordingly, compounds such as benzene, toluene, triphenyl methane, and carbon tetrachloride can be utilized. However, mercaptans such as the alkyl and/or alkyl mercaptans having from 8 to about 18 carbon atoms and preferably from about 12 to about 14 carbon atoms are preferably utilized. The tertiary alkyl mercaptans having from 12 to 14 carbon atoms are highly preferred. Examples of suitable mercaptans include n-octyl mercaptan, n-dodecyl mercaptan, t-octyl mercaptan, t-dodecyl mercaptan, p-tridecyl mercaptan, tetradecyl mercaptan, hexadecyl mercaptan, and the like, as well as mixtures thereof. The amount of the molecular weight modifiers is an effective amount to provide for the proper retention of the tensile strength of the interpolymer, for example from about 0.1 to about 5.0 parts by weight and desirably from about 0.2 to about 1.0 parts by weight for every 100 parts by weight of the monomers.

Free-radical initiators are utilized to polymerize the various monomers and are utilized in amounts sufficient to obtain a desired molecular weight. A suitable amount is generally from about 0.25 to about 2.0 with from about 0.5 to about 1.5 parts being preferred for every 100 parts by weight of the monomers. Conventional free-radical initiators can be utilized as well as those known to the art and to the literature. Specific examples include ammonium persulfate, potassium persulfate, or sodium persulfate, hydrogen peroxide, and the like. Other free-radical initiators can be utilized which decompose or become active at a temperature utilized during polymerization. Examples of other free-radical catalysts include cumene hydroperoxide, dibenzoyl peroxide, diacetyl peroxide, dodecanoyl peroxide, di-t-butyl peroxide, dilauoyl peroxide, bis(p-methoxy benzoyl) peroxide, t-butyl peroxy pivalate, dicumyl peroxide, isopropyl percarbonate, di-sec-butyl peroxidicarbonate, azoisdimethylvaleronitrile, 2,2'-azobisisobutyronitrile, 2,2'-azobis-2-methyl-butyronitrile, 2,2'-azobis (methylisobutyrate) and the like and mixtures thereof. It is preferred to use the inorganic persulfates of which the sodium salt is preferred since they impart better color to the resulting polymer when dried. Organic hydroperoxides such as t-butyl hydroperoxides are preferred for the cationic system of the present invention.

Chelating agents can be utilized during polymerization to tie up various metal impurities as well as to achieve a uniform polymerization. The amounts of such chelating agents are generally small such as from about 0.01 to about 0.25 parts by weight for every 100 parts by weight of the monomers. Examples of suitable chelating agents include ethylene diamine tetraacetic acid, nitrilotriacetic acid, citric acid, and their ammonium, potassium, and sodium salts.

Various shortstop compounds can also be utilized. Not only do the shortstop compounds terminate the polymerization in the reactor at desired conversion levels, but also prevent further polymerization, crosslinking, etc., during stripping, and the like. Examples of suitable shortstop agents include hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate plus sodium hydrosulfite, and the like. The amount of shortstop utilized is from about 0.05 to about 0.25 parts by weight for every 100 parts by weight of said monomers. Of course, other conventional chelating agents as well as shortstops can be utilized including those known to the art and to the literature.

The elctrolytes are generally neutral such as the various sulfates, and various monobasic salts thereof. These and other electrolytes are known to the art as well as to the literature. The amount of such electrolytes can generally be from about 0.05 to about 1.0 and preferably from about 0.05 to about 0.75 parts by weight for every 100 parts by weight of said monomers.

The above description relates to the preparation of an emulsion copolymer utilizing functional monomers which are generally anionic in accordance with the dominant practice of forming aqueous emulsions or latexes. However, it is to be understood that various cationic monomers can be utilized and that such are sometimes an advantage with regard to adhesion to various substrates, and the like. Whenever such cationic monomers are utilized, they are utilized in lieu of the above-noted optional anionic functional monomers. Examples of suitable cationic monomers include the dimethyl sulfate quaternized product of dimethyl amino ethyl methacrylate, the methyl chloride quarternized product of dimethyl amino ethyl methacrylate, methacryl amino propyl trimethyl ammonium chloride, dimethyl diallyl ammonium chloride, N(3-chloro-2-hydroxy propyl)trimethyl ammonium chloride, 2-hydroxy-3-methacryloxyloxy propyl trimethyl ammonium chloride, and the amine monomers dimethyl amino ethyl (meth)acrylate, diethyl amino ethyl (meth)acrylate, tertiary butyl amino ethyl methacrylate and dimethyl amino propyl methacrylamide. When cationic monomers are utilized in lieu of the anionic monomers, cationic type surfactants are very desirable. Moreover, the preparation of the copolymers made from such cataionic functional monomers differs in that cationic additives are utilized including various cationic chain transfer agents or extenders, various cationic initiators, various cationic chelating agents, various cationic shortstops, and the like. Otherwise, preparation procceds in a manner as noted above, for example the cationic monomers are free radically polymerized.

Polymerization of the various monomers is carried out at a temperature sufficient to activate the initiators and the double bonds of the monomers. However, extremely high temperatures are avoided since they cause a run-away reaction. Too low temperatures are not desired since they retard polymerization. Suitable polymerization temperatures are from about 2° C. to about 90° C., desirably from about 35° C. to about 80° C., and preferably from about 65° C. to about 77° C. Polymerization time will naturally vary depending upon the type of monomers utilized, the type of initiator utilized, and the degree of polymerization desired. Hence, typical polymerization times can range from about 5 to about 35 hours. Polymeriztion is generally carried out to completion and conducted in an acidic medium when acidic monomers are utilized. Upon completion of the reaction or the desired degree of polymerization, optional bases can be added to neutralize the latex. Examples of such optional bases include NaOH, KOH, NH$_4$OH, and the like. However. an acidic latex is desired having a pH of from about 2.0 to 7.0 and desirably from about 2.0 to about 4.0.

The free radical polymerization can be carried out according to any conventional method including batch, incrmental, or continuous. The water used during the polymerization should be free of deleterious material and hence is often distilled or ion exchanged water. The amount of water used is sufficient to enable the formation of an emulsion and to enable proper mixing of the various ingredients as well as to obtain the desired rate and degree of polymerization, heat transfer, and the like. Upon completion of polymerization, the amount of copolymer or solids content can vary from about 10% to about 60% by weight and preferably from about 40% to about 55% by weight.

Desirably polymerization is conducted in an inert atmosphere such as nitrogen, helium, argon, and the like and hence it is carried out in a closed reactor. The reactor can be any conventional reactor and thus have suitable ports, agitation means, heating and cooling means, and the like. In accordance with conventional practice, the reactors utilized are generally cleaned as by flushing with water between polymerizations to remove traces of various initiators, shortstops, residues, surfactants, and the like.

The copolymer latexes of the present invention can be treated with other conventional additives such as antioxidants, biocides, defoamers, and the like as known to the art and to the literature.

The latexes of the present invention can be compounded with various finely divided fillers such as various paper coating fillers, for example clays, kaolin, calcium carbonate, titanium dioxide, zinc oxide and other inorganic fillers commonly used in the paper coating compositions. Various thickening agents, viscosity stabilizers, and the like can also be utilized.

The latexes of the present invention can be utilized on various cellulosic materials such as paper, for example paper towels, coated paper, masking tapes, label tapes, containers, or the like. They can be applied in any conventional manner such as by spraying, by saturation, e.g. dipping the paper into the latex, by coating, and the like. The latexes can further be applied to variously formed materials, be they paper, synthetic fibers such as polyesters, polypropylenes, rayon, nylons, to masking tapes, to carpets, and the like. Another desired area of use is on various nonwoven textiles. Specific examples include mats, various hospital disposable products such as face masks, gowns, glooves, and the like, as well as commercial applications wherever mats are utilized such as in diapers, and the like. A preferred use is in the application of paper since it has been found that the latexes of the present invention unexpectedly improved cure rate development.

Once the latexes of the present invention have been applied to a substrate, they can be cured. Curing generally occurs by heating at a temperature of from about 25° C. to about 180° C. and preferably from about 100° C. to about 150° C. Curing can occur as in the presence of a heating means, for example an oven, an electron-beam, infrared heat, or at ambient temperature, or the like.

According to the present invention, the use of two functional monomers, that is an activatable ester monomer and either an acrylamide type monomer, a methacrylamide type monomer, a vinyl ether type monomer, or a carboxylic acid type monomer, or combinations thereof, has been found to generally result in a quicker cure time and/or a lower cure temperature when utilized with the various latex monomers. This is desirble since quicker or faster crosslinking times are useful. Thus, when the results of Example 1 are plotted, as in FIG. 1, it is seen that the initial cure strength, that is the wet tensile strenght, is much greater for compounds of the present invention containing an activatable ester as well as a second functional containing monomer, for example acrylic acid. Cure time is very important in the utilization of latexes in that short heating times are highly desirable. For example, in the application of coatings to cellulosic material such as towels, quick cure times are desired. Example 1, as well as FIG. 1, also reveals that improved wet strengths are obtained utilizing a second functional monomer. That is at all cure times, large absolute improvement values in the wet tensile strength are obtained. Considering Example 2 as well as FIG. 2, it is once again apparent that utilization of a second functional monomer such as acrylamide yields great improvements in the initial cure time, that is the initial slope of the various curves. More importantly, as set forth in Example 2, dramatic improvements in the wet tensile strength are obtained and thereby conclusively proving that a synergistic result is obtained.

In general, use of the second or more functional type monomers results in an absolute value increase in the wet tensile strength at generally any given cure time. For example, at 300 seconds of at least 1.5, desirably 2.0, and preferably 2.5 lbs/in.

The invention will be better understood by reference to the following examples.

The test method utilized in the examples for measuring wet tensile strength is as follows:

Whatman #4 chromatographic paper die-cut to 8"×10" is used with a tolerance of ±5.0% in an untreated weight basis. The sheets are saturated with the latex using a laboratory padder at a binder add-on target of 20±1.5% based on the finished sheet weight. The saturated sheets are air dried at room temperature and then duplicate sheets are cured on the steam heated drier cans at 315° F. for 15, 30, 60, and 300 seconds. All sheets are conditioned in accordance with TAPPI test method T402 before testing. Then they are immersed in distilled water until they are completely wetted. The tensile is then determined on four test strips in both the machine direction (MD) and in the cross direction (CD) for each cured sheet. The average of the eight results in each direction and the total tensile is reported as the sum of the CD and MD averages. This result is normalized to a basic weight of 73.0 lbs./300 ft. and a binder add on of 20%.

EXAMPLE I

Bottle scale polymerizations were carried out using the ingredients set forth below. In each case an initial charge was made to the bottles using the ingredients in the order listed in the table. The bottles were flushed with nitrogen, capped, and allowed to react 45 minutes at 65° C.

The bottles were opened, recharged with the appropriate amount of styrene, Sulfole 120 and butadiene, as listed in the table. This charge was reacted until the bottles were under vacuum as a result of most of the monomers having reacted. The bottles were opened a second time and further monomers, Sulfole 120, MAGME, and other cofunctional monomers added, as listed. This charge was also reacted to vacuum. The latexes obtained were tested without stripping. Some latexes were tested at the pH of the finished latex while others were tested at a pH of about 7.5 after adjustment with ammonium hydroxide.

| LATEX | | | | | | | |
|---|---|---|---|---|---|---|---|
| A | B | C | D | E | F | G | H |

| | A | B | C | D | E | F | G | H |
|---|---|---|---|---|---|---|---|---|
| INITIAL CHARGE | | | | | | | | |
| Water, ml | 68 | 68 | 68 | 68 | 68 | 68 | 68 | 68 |
| Solution A, ml | 40 | 40 | 40 | 40 | 0 | 0 | 0 | 0 |
| Solution B, ml | 0 | 0 | 0 | 0 | 40 | 40 | 40 | 40 |
| Solution C, ml | 60 | 60 | 60 | 60 | 60 | 60 | 60 | 60 |
| Solution D, ml | 18 | 18 | 18 | 18 | 18 | 18 | 18 | 18 |
| Styrene, gms | 15 | 15 | 15 | 15 | 15 | 15 | 15 | 15 |
| Reacted 45 minutes @ 65° C. | | | | | | | | |
| FIRST CHARGE BACK | | | | | | | | |
| Styrene, gms | 36 | 36 | 40 | 36 | 38 | 34 | 35 | 34 |
| Solution E, gms | 10 | 10 | 10 | 10 | 10 | 10 | 10 | 10 |
| Butadiene, gms | 40 | 40 | 40 | 40 | 40 | 40 | 40 | 40 |
| Reacted to vacuum | | | | | | | | |
| SECOND CHARGE BACK | | | | | | | | |
| Water, ml | 0 | 0 | 42 | 8 | 40 | 6 | 29 | 13 |
| Solution F, ml | 53 | 53 | 11 | 53 | 11 | 53 | 53 | 53 |
| Solution D, ml | 10 | 10 | 10 | 10 | 10 | 10 | 10 | 10 |
| Solution G, gms | 0 | 0 | 0 | 0 | 4 | 4 | 0 | 0 |
| Hydroxyethyl Acrylate, gms | 0 | 0 | 0 | 0 | 0 | 0 | 2 | 4 |
| Styrene, gms | 36 | 18 | 40 | 36 | 38 | 34 | 35 | 34 |
| Solution E, gms | 10 | 10 | 10 | 10 | 10 | 10 | 10 | 10 |
| Solution H, gms | 0 | 20 | 0 | 0 | 0 | 0 | 0 | 0 |
| Butadiene, gms | 40 | 40 | 40 | 40 | 40 | 40 | 40 | 40 |
| Reacted to Vacuum | | | | | | | | |

| Solution A | 0.4% (weight/volume i.e., W/V) |
| Dowfax 2A-1, 2.5% | (W/V) Sipex BOS, 1.5% (W/V) Aerosol MA, and 0.25% (W/V) Sequestrene Na-3 in deionized water. |
| Solution B | Same as A except 0.425% (W/V) Dowfax 2A-1 |
| Solution C | 5.0% (W/V) itaconic acid in deionized water |
| Solution D | 5.0% (W/V) sodium persulfate in deionized water |
| Solution E | 3.8% (W/V) Sulfole 120 in styrene |
| Solution F | 18.9% (W/V) MAGME in deionized water |
| Solution G | 50% (W/W) acrylamide in deionized water |
| Solution H | 20% (W/W) acrylic acid in styrene |

| LATEX PROPERTIES | | | | | | | | |
|---|---|---|---|---|---|---|---|---|
| | A | B | C | D | E | F | G | H |
| Total Solids, % | 44.9 | 44.1 | 44.6 | 44.3 | 44.4 | 44.1 | 45.0 | 44.6 |
| pH | 2.3 | 2.2 | 2.5 | 2.2 | 2.6 | 2.2 | 2.2 | 2.1 |
| Brookfield Viscosity, cps. | 27 | 29 | 27 | 30 | 27 | 42 | 35 | 36 |
| Surface Tension, dynes/cm | 45.7 | 44.7 | 49.7 | 44.6 | 47.1 | 44.3 | 42.8 | 42.8 |

Latexes A and B of the bottle scale series relates to the use of MAGME in combination with acrylic acid and the use of itaconic acid in the initial step. These latexes both had 5 parts of MAGME and 0 and 2 parts respectively of acrylic acid.

Both latexes were tested in the Whatman #4 paper without steam stripping but with the pH adjusted to 7.5 by ammonium hydroxide. Latex B was also tested at 2.5 pH before adjustment. Results for total wet tensile strength were as follows:

| | A (Control) | B (Acrylic Acid) | B (Acrylic Acid) |
|---|---|---|---|
| pH | 7.5 | 7.5 | 2.5 |
| Cure Time, Secs. | | | |
| 15 | 22.3 | 25.0 | 26.9 |
| 30 | 26.9 | 27.0 | 30.1 |
| 60 | 28.7 | 30.4 | 29.9 |
| 300 | 31.9 | 34.1 | 29.6 |

It is evident that Latex B which contains both acrylic acid and MAGME is better than Latex A which contains only MAGME. Not only did both "B" examples have a faster cure rate, but a higher wet tensile strength was also obtained. Thus, synergistic results were obtained.

EXAMPLE 2

Latexes C, D, E, and F of the bottle series illustrate the use of acrylamide with MAGME and the synergistic effect thereof. Test results for total wet tensiles of Whatman #4 paper saturated with these latexes at low pH are as follows:

| Latex | C | D | E | F |
|---|---|---|---|---|
| MAGME, PHM | 1 | 5 | 1 | 5 |
| Acrylamide, pHM | 0 | 0 | 1 | 1 |
| Cure Time, Secs. | | Total Wet Tensiles | | |
| 15 | 16.9 | 25.0 | 18.3 | 33.0 |
| 30 | 18.2 | 26.1 | 21.1 | 33.8 |
| 60 | 19.8 | 27.6 | 22.3 | 32.8 |
| 300 | 19.4 | 27.7 | 25.5 | 30.9 |

It is apparent from the above that increases in either MAGME or acrylamide (when the other is held constant) yield improved wet tensile strenghts and increased cure rates at low cure times. For example, at 15 seconds and no acrylamide (C and D) increasing the MAGME from 1 to 5 parts increases the wet tensile (25.0−16.9)=8.1 units. Increasing the acrylamide from 0 to 1 part (C and E) increases the wet tensile at 15 second cure (18.3−16.9)+1.4 units. However, increasing both MAGME and acrylamide (C compared with E) results in an improvement (33.0−19.4) of 13.6 units which is much more than the sum of the individual (8.1+1.4=9.5) effects and hence a synergistic result.

EXAMPLE 3

This example relates to the fact that a single anionic surfactant, Aerosol MA, can also be used to produce latexes. The latexes were prepared in bottles using 0.78 PHM of Aerosol MA-80 as the only surfactant.
Properties of the latexes were:

|  | I | J | K |
|---|---|---|---|
| MAGME | 3.5 | 5.0 | 5.0 |
| Acrylic Acid | 0 | 2 | 0 |
| Acrylamide | 2 | 0 | 2 |
| Coagulum, wet gms, % | 0.4 | 0.4 | 0.4 |
| pH | 2.2 | 2.1 | 2.1 |
| Total Solids, % | 39.9 | 39.9 | 40.8 |
| Viscosity | 18 | 18 | 18 |
| Surface Tension, dynes/cm | 38.9 | 38.9 | 38.9 |

EXAMPLE 4

This example relates to the preparation of latexes in bottles using a cationic system. The ingredients and latex properties are set forth in the following table:

| | LATEXES | | | | | |
|---|---|---|---|---|---|---|
| | L | M | N | O | P | Q |
| INITIAL CHARGE | | | | | | |
| Water, Ml | 64 | 64 | 64 | 64 | 64 | 64 |
| Solution A, ml | 40 | 40 | 40 | 40 | 40 | 40 |
| Solution B, ml | 15 | 15 | 15 | 15 | 15 | 15 |
| Solution C, ml | 8 | 8 | 8 | 8 | 8 | 8 |
| Solution D, ml | 40 | 40 | 40 | 40 | 40 | 40 |
| Solution E, ml | 8 | 8 | 8 | 8 | 8 | 8 |
| Styrene, gm | 15 | 15 | 15 | 15 | 15 | 15 |
| Reacted 45 minutes @ 65° C. | | | | | | |
| Solution F, ml | 8 | 8 | 8 | 8 | 8 | 8 |
| Styrene, gms | 31 | 29 | 30 | 28 | 29 | 27 |
| Solution G, gms | 10 | 10 | 10 | 10 | 10 | 10 |
| Solution E, gms | 4 | 4 | 4 | 4 | 4 | 4 |
| Butadiene | 40 | 40 | 40 | 40 | 40 | 40 |
| Reacted to Vacuum | | | | | | |
| SECOND CHARGE BACK | | | | | | |
| Water, ml | 29 | 4 | 27 | 2 | 25 | 0 |
| Solution F, ml | 8 | 8 | 8 | 8 | 8 | 8 |
| Solution H, ml | 40 | 67 | 40 | 67 | 40 | 67 |
| 50% acrylamide, gms | 0 | 0 | 4 | 4 | 8 | 8 |
| Styrene, gms | 27 | 25 | 26 | 24 | 25 | 23 |
| Solution G, mgs | 10 | 10 | 10 | 10 | 10 | 10 |
| Solution E, mgs | 8 | 8 | 8 | 8 | 8 | 8 |
| Butadiene, gms | 40 | 40 | 40 | 40 | 40 | 40 |
| Raised temperature to 170° F. and reacted to vacuum. | | | | | | |
| 70% t-butyl hydroperoxide, gms | 0.4 | 0 | 0.4 | 0 | 0.4 | 0.4 |

| Solution A | 7.0% (W/V) Arquad C-33 in deionized water |
|---|---|
| Solution B | 4.8% (W/V) aluminum chloride - hexahydrate in water |
| Solution C | 5.0% (W/V) sodium chloride in water |
| Solution D | 7.5% (W/V) Sipomer Q-5-80 in water |
| Solution E | 3.5% (W/V) t-butyl hydroperoxide in styrene |
| Solution F | 12.5% (W/V) Arquad C-33 in water |
| Solution G | 3.75% (W/V) Sulfole 120 in styrene |
| Solution H | 15.0% (W/V) MAGME in water |

| | LATEX PROPERTIES | | | | | |
|---|---|---|---|---|---|---|
| | L | M | N | O | P | Q |
| Total Solids, % | 43.4 | 41.8 | 43.5 | 42.0 | 43.2 | 41.0 |
| pH | 2.3 | 2.1 | 2.4 | 2.1 | 2.4 | 2.4 |
| Viscosity | 19 | 21 | 21 | 20 | 32 | 18 |
| Surface Tension | 39.9 | 45.7 | 43.8 | 42.8 | 40.9 | 39.9 |

All latexes were essentiall coagulum free.

| CHEMICAL DEFINITIONS: | |
|---|---|
| MAGME | Methyl acrylamidoglycolate methyl ether $CH_2 = CH-CONHCHOCH_3COOCH_3$ American Cyanamid Company |
| Sequestrene Na-3 | Trisodium ethylene diamine tetra acetate dihydrate. Ciba-Geigy Corp. |
| Aerosol MA | Bis(1-methylamyl) sodium sulfosuccinate American Cyanamid Co. an anionic surfactant. 80% in water. |
| Sipex BOS | Sodium 2-ethyl hexyl sulfate Alcolac Inc. 40% aqueous solution. |
| Sulfole 120 | t-dodecyl mercaptan, avg. mol. wt. 198 Calc. purity wt. 96.8% and mercaptan sulfur wt. 15.4% Phillips Petroleum Co., Rubber Division |
| Arquad C-33 | Trimethyl cocoammonium chloride Armak Co. - 33% aqueous solution. |
| Sipomer Q-5-80 | Dimethyl sulfate quarternary of dimethylamino-ethyl methacrylate $CH_2 = C(CH_3)COOCH_2CH_2N^+(CH_3)_3CH_2OSO_3$ 80% aqueous solution. Alcolac, Inc. |

While in accordance with the patent statutes, a best mode and preferred embodiment has been set forth in detail, the scope of the present invention is limited by the scope of the attached claims.

What is claimed is:
1. A latex, comprising:
an emulsion copolymer in the form of a solid, said emulsion copolymer made by polymerizing (1) at least one latex forming monomer (2) at least one functional type monomer having an activatable methyl, ethyl, propyl, or butyl ester group and a vinyl group with (3) at least one functional anionic type monomer, wherein said latex forming monomer is a conjugated diene, or a conjugated diene and at least one different conjugated diene comonomer having from 4 to 8 carbon atoms, or a conjugated diene and a vinyl substituted aromatic comonomer having from 8 to 12 carbon atoms, or a vinyl ester having a 1 to 8 carbon atom alkyl ester portion, or a vinyl ester having a 1 to 8 carbon atom alkyl ester portion and at least one ester of a mono or a dicarboxylic acid comonomer having from 2 to 12 carbon atoms, or ethylene, or ethylene and a vinyl chloride comonomer, or ethylene and a vinyl ester comonomer having a 1 to 8 carbon atom alkyl ester portion, wherein the total amount of said functional monomers is from 0.5% to about 15% by weight based upon the total weight of said emulsiion copolymer forming monomers, wherein the amount of said latex forming monomer is from about 85% to about 99.5% by weight based upon the total weight of said emulsion copolymer forming monomers, wherein the pH of said latex is from about 2.0 to about 7.0, wherein said latex contains from about 10 percent to about 60 percent by weight of said copolymer solids, and wherein said anionic type functional monomer is an acrylamide or a 1 to 2 carbon atom alkyl derivative thereof, a methacrylamide or a 1 to 2 atom alkyl derivative thereof; or combinations thereof.

2. A latex according to claim 1,
wherein said alkyl derivative of said acrylamide functional monomer having 1 or 2 carbon atoms is attached to either the nitrogen atom, said vinyl group, or both, and wherein said alkyl derivative of said methacrylamide functional monomer having 1 or 2 carbon atoms is attached to either the nitrogen atom, the vinyl group, or both.

3. A latex according to claim 2, wherein the amount of said solids in said latex is from about 40% to about 55% by weight, wherein said conjugated diene and said different conjugated diene has from 4 to 6 carbon atoms, wherein the amount of said vinyl substituted aromatic comonomer is from about 0% to about 70% by weight and wherein the amount of said conjugated diene comonomer is from 1% to 99% by weight based upon the weight of the total monomers;
wherein said vinyl ester has a 1 to 5 carbon alkyl ester portion, wherein said ester of said mono or said dicarboxylic acid monomer is from about 5% to about 50% by weight based upon the weight of the total monomers, wherein the amount of said vinyl chloride comonomer is from about 5% to about 40% by weight based upon the weight of the total monomers, wherein said vinyl ester comonomer has a 1 to 5 carbon atoms alkyl ester portion and wherein the amount of said vinyl ester comonomer is from about 5% to about 90% by weight based upon the weight of the total monomers, wherein the pH of said latex is from about 2.0 to about 4.0, wherein the amount of said functional monomers if from about 1% to about 10% by weight, wherein the amount of said latex forming monomer is from about 90% to about 99% by weight, and wherein said activatable ester monomer is
methyl acrylamidoglycolate (MAG)
ethyl acrylamidoglycolate (EAT)
butyl acrylamidoglycolate (BAG)
methyl acrylamidoglycolate methyl ether (MAGME)
butyl acrylamidoglycolate butyl ether (BAGBE)
methyl methacryloxyacetate
ethyl acrylamido-N-oxalate (N-ethyloxalyl acrylamide)
N,N'-Bis(ethyloxalyl)acrylamide
N-isopropyl, N-ethyloxalyl-3-propylamino methacrylamide
N-ethyloxalyl-N'-methyleneaminoacrylamide
ethyl N-2-ethyloxamatoacrylate
ethyl 3-pyruvylacrylate
ethyl methylenepyruvate
methyl acrylthiocarbonyloxyacetate (Methyl thiacryloxyacetate)
methyl thiacrylthioglycolate
methyl acryl-2-thioglycolate
methyl thiacrylamidoacetate
methyl acrylamidoglycolate thioether
methyl acrylamido-N-methylenethioglycolate, or
p-ethyl oxalyl styrene.

4. A latex according to claim 3, wherein said copolymer is free-radically polymerized,
wherein said latex forming monomer is butadiene, butadiene and styrene, vinyl acetate, ethylene and vinyl chloride, ethylene and vinyl acetate, or combinations thereof,
wherein said anionic functional monomer is acrylamide or methacrylamide,
and wherein said functional activatable ester monomer is methacrylamidoglycolate, methylacrylamidoglycolate methyl ether, butylacrylamidoglycolate, butyacrylamidoglycolate butyl ether, or combinations thereof.

* * * * *